US012427649B2

United States Patent
Wang et al.

(10) Patent No.: US 12,427,649 B2
(45) Date of Patent: Sep. 30, 2025

(54) INTELLIGENT TOWING ROBOT

(71) Applicant: WEIHAI TIANTE INTELLIGENT TECHNOLOGY CO., LTD., Weihai (CN)

(72) Inventors: Jianfeng Wang, Weihai (CN); Liwen Cao, Weihai (CN); Yuan Lyu, Weihai (CN); Jingang He, Weihai (CN); Qingling Zhao, Weihai (CN); Quankuan Liu, Weihai (CN); Jiahao Liu, Weihai (CN); Yu Sun, Weihai (CN)

(73) Assignee: WEIHAI TIANTE INTELLIGENT TECHNOLOGY CO., LTD., Weihai (CN)

( * ) Notice: Subject to any disclaimer, the term of this patent is extended or adjusted under 35 U.S.C. 154(b) by 0 days.

(21) Appl. No.: 19/098,547

(22) Filed: Apr. 2, 2025

(65) Prior Publication Data
US 2025/0229411 A1 Jul. 17, 2025

Related U.S. Application Data

(63) Continuation of application No. 18/823,024, filed on Sep. 3, 2024.

(30) Foreign Application Priority Data

Dec. 29, 2023 (CN) .......................... 202311869852.X

(51) Int. Cl.
*B25J 11/00* (2006.01)
*B25J 5/00* (2006.01)
*B62D 55/06* (2006.01)

(52) U.S. Cl.
CPC ............. *B25J 5/005* (2013.01); *B25J 11/005* (2013.01); *B62D 55/062* (2013.01)

(58) Field of Classification Search
CPC . B25J 9/1661; B25J 9/163; B25J 5/005; B25J 11/005; G05B 2219/40391; G05B 2219/40116; B62D 55/062
See application file for complete search history.

(56) References Cited

U.S. PATENT DOCUMENTS

2011/0170994 A1* 7/2011 Coombs .................. B60P 3/125
414/427
2016/0115702 A1* 4/2016 Nordbruch ........... G05D 1/0055
414/231

(Continued)

FOREIGN PATENT DOCUMENTS

CN 107284552 A 10/2017
CN 219709060 U 9/2023

(Continued)

OTHER PUBLICATIONS

U.S. Appl. No. 18/823,024, filed Mar. 24, 2024, Wang et al.*

(Continued)

*Primary Examiner* — Mcdieunel Marc
(74) *Attorney, Agent, or Firm* — Scully, Scott, Murphy & Presser, P.C.

(57) ABSTRACT

An intelligent towing robot is provided. The robot includes a vehicle body, an electrical system, a powertrain, and a towing part. The vehicle body includes a main body and a side frame. The main body has an upper mounting chamber and a lower mounting chamber. The electrical system is integrated into the upper mounting chamber, and the powertrain is arranged in the lower mounting chamber. The front and rear ends of the lower part of the main body are respectively provided with axle assemblies passing through the lower mounting chamber in the left-to-right direction. Two sides of the axle assembly are respectively connected with a rotating wheel, and outsides of the rotating wheels on each side mesh with a track. The powertrain includes four (Continued)

driving motors and a transmission device, and each driving motor is independently connected to the rotating wheel through the transmission device.

8 Claims, 6 Drawing Sheets

(56) References Cited

U.S. PATENT DOCUMENTS

| | | | | |
|---|---|---|---|---|
| 2022/0026922 A1* | 1/2022 | Claesson | ................ | H04W 4/46 |
| 2022/0032458 A1* | 2/2022 | Chu | ................... | B25J 11/0005 |
| 2022/0371193 A1* | 11/2022 | Chu | ....................... | B25J 9/163 |

FOREIGN PATENT DOCUMENTS

| | | |
|---|---|---|
| CN | 221188812 U | 6/2024 |
| WO | 2022259672 A1 | 12/2022 |

OTHER PUBLICATIONS

Hu et al., Design and research of telescopic gate, 2020, IEEE, p. 887-890 (Year: 2020).*

Hayashi et al., Micro moving robotics, 1998, IEEE, p. 41-50 (Year: 1998).*

Carmeli et al., A urban vehicle with very low fuel consumption: realization, analysis and optimization, 2014, IEEE, p. 1-6 (Year: 2014).*

Zhang et al., The Design of a Scissor Stair Climbing Robot, 2021, IEEE, p. 10-15 (Year: 2021).*

Notification of Allowance dated Jul. 22, 2024 received in Chinese Patent Application No. CN 202311869852.X.

* cited by examiner

INTELLIGENT TOWING ROBOT

CROSS REFERENCE TO RELATED APPLICATIONS

This application is a continuation application of USSN: Ser. No. 18/823,024 filed on Sep. 3, 2024 which claims the benefit of and priority to Chinese Patent Application No. 202311869852.X, filed on Dec. 29, 2023, the entire disclosure of each of which is incorporated herein by reference.

TECHNICAL FIELD

The present application relates to the technical field of traction devices, and in particular to an intelligent towing robot.

BACKGROUND

As Recreational Vehicle (RV) travel becomes more popular, two typical types of RVs have emerged. One is a drivable RV, and the other is a towable RV. Since the towable RV itself does not have a driving force and needs to rely on a towing vehicle, the interior space of the towable RV is not limited by the size of the vehicle body. It has the advantages of high comfort and convenience and is sought after by more and more people.

In the conventional technique, towable RVs are generally connected to cars, SUVs, or motorhomes with connectors and hooks, and can move forward and stop synchronously with the towing vehicle through synchronous braking and the like. When arriving at the destination, the towable RV is separated from the towing vehicle, the front of the towable RV is connected to a guiding wheel, and the towable RV is moved to a suitable parking position and then stably parked by the front support legs of the towable RV. At this time, the towing vehicle is free to move.

SUMMARY

The embodiments of the present application can be implemented through the following technical solutions.

In some embodiments, an intelligent towing robot includes a vehicle body, an electrical system, a powertrain, and a towing part.

In some embodiments, the vehicle body includes a detachably connected main body, a detachably connected side frame, and a detachably connected external accessory, and the external accessory is integrated with a self-locking switch.

In some embodiments, the main body has an upper mounting chamber and a lower mounting chamber, the electrical system is integrated into the upper mounting chamber, and the powertrain is arranged in the lower mounting chamber.

In some embodiments, axle assemblies passing through the lower mounting chamber in a left-to-right direction are respectively provided at a front end and a rear end of a lower part of the main body, and two sides of the axle assembly are respectively connected with rotating wheels, and the outsides of the rotating wheels on both sides mesh with a track.

In some embodiments, an inner partition is provided in the middle part of the side frame, and two mounting holes for driving motor output shafts are respectively provided on the inner partitions located on both sides of the main body.

In some embodiments, the powertrain includes four driving motors and a transmission device. The four driving motors are arranged on two sides of the main body in a same horizontal plane in a staggered way. One end of each driving motor is connected inside the main body, and the output end extends outward through the side of the main body to extend out of the mounting hole for driving motor output shaft and is independently connected to the rotating wheel through the transmission device.

In some embodiments, an axle head limiting plate and an outer track closing ring are also provided on the outer side of the rotating wheel. One end of the axle head limiting plate is installed on the axle assembly, and the other end is connected to the side frame through a limiting plate gasket.

In some embodiments, the main body is in a shape of a rectangular tube, and the two side frames are in a U-shaped cover shape and are respectively connected to two sides of the main body.

In some embodiments, locking positioning sliding grooves extending in a front-to-rear direction are provided on a left middle part and a left lower part of the main body; each locking positioning sliding groove is in a dovetail shape with a large interior and a small opening; a locking sliding bar that cooperates with the locking positioning sliding groove in an insertable way is provided on a side of each side frame; and the locking sliding bar is slidably connected to the locking positioning sliding groove.

In some embodiments, a partition plate is detachably connected to an inner middle part of the main body; mutually parallel mounting bars are respectively provided on the left and right sides of the inner middle part of the main body; mounting sliding grooves are provided on the upper side of the mounting bars; positioning sliding bars cooperating with the mounting sliding grooves are respectively provided on the left and right sides of the partition plate; the partition plate is slidably connected to the upper side of the mounting bars via the positioning sliding bars; and the partition plate divides the interior of the main body into the upper mounting chamber and the lower mounting chamber.

In some embodiments, the self-locking switch includes a self-reset button, a first relay, a first switch transistor, a first resistor, and a first capacitor.

In some embodiments, the self-reset button includes a first pin, a second pin, and a third pin, the first pin is connected to the drain of the first switch transistor, the second pin is grounded, the third pin is connected to the first end of the first resistor and the positive electrode of the first capacitor, and each of the first pin and the third pin forms a normally open switch with the second pin.

In some embodiments, the output end of the driving motor is connected to a driving sprocket; the rotating wheel is provided with a driven sprocket, the driving sprocket and the corresponding driven sprocket are connected and transmitted through a transmission chain; and the driving sprocket, the driven sprocket and the transmission chain constitute the transmission device.

In some embodiments, the number of transmission chains is four; two of the transmission chains are long chains, and the other two of the transmission chains are short chains; and the two transmission chains located on the same side of the vehicle body are of different lengths.

In some embodiments, the rotating wheel includes a left halftrack wheel and a right halftrack wheel; and the driven sprocket is installed between the left halftrack wheel and the right halftrack wheel.

In some embodiments, the rotating wheel also includes an annular gasket, which is connected to a positioning shoulder on the outer side of the rotating wheel and a middle part of the rotating wheel.

In some embodiments, the intelligent towing robot also includes a load-bearing tension wheel, and the number of the load-bearing tension wheels is multiple; and the multiple load-bearing tension wheels are respectively connected to a left lower part and a right lower part of the main body and are in contact with the track between two adjacent rotating wheels.

In some embodiments, a transmission chain groove is provided on the outer wall of the load-bearing tension wheel adjacent to the transmission chain; the transmission chain groove is a groove arranged along the circumference of the load-bearing tension wheel; and the transmission chain passes through the transmission chain groove, so that there is no contact between the load-bearing tension wheel and the transmission chain.

REFERENCE NUMBERS IN THE DRAWINGS

Figure 1:
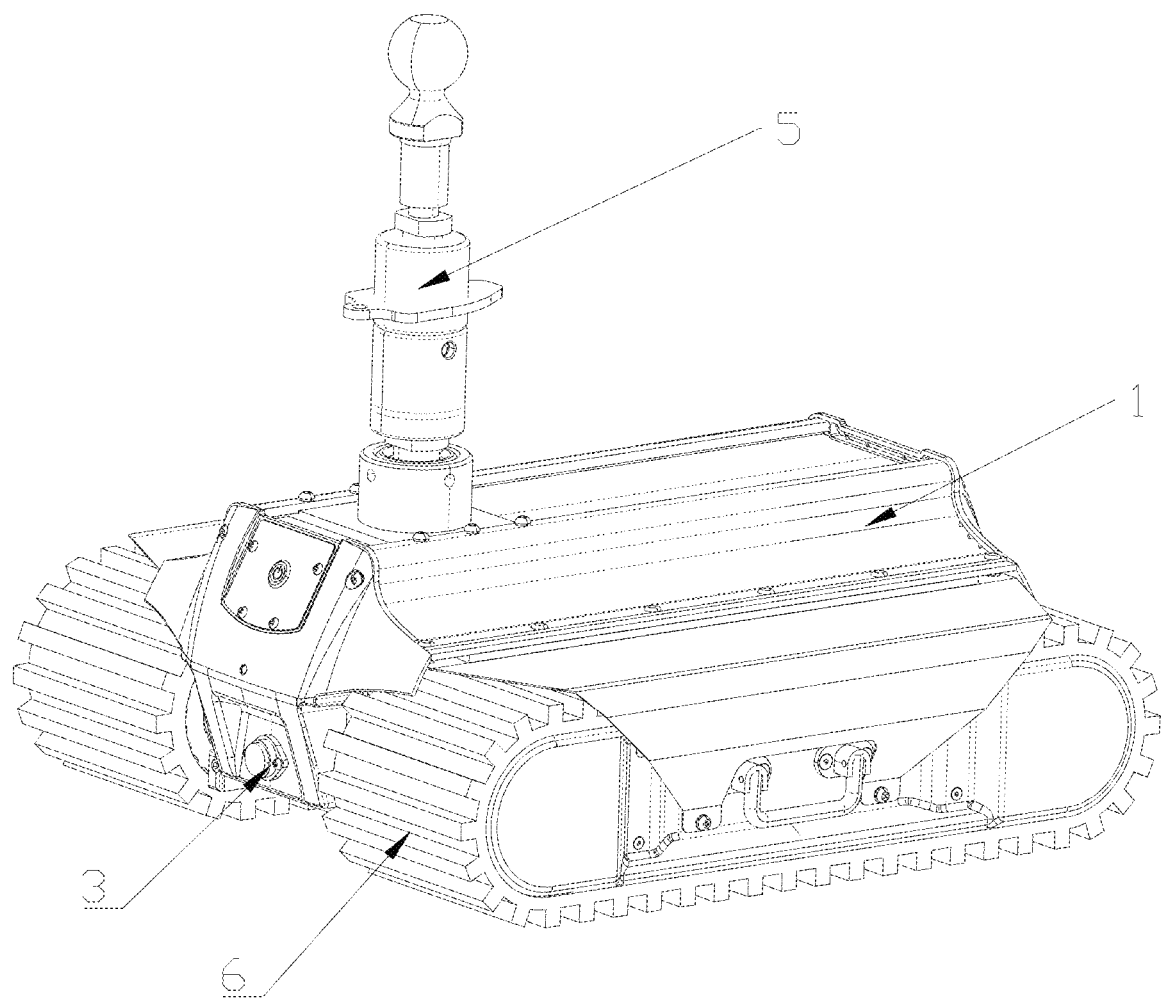
FIG. 1 is a schematic diagram of a three-dimensional structure of an intelligent towing robot in exemplary embodiments of the present application.
Figure 2:
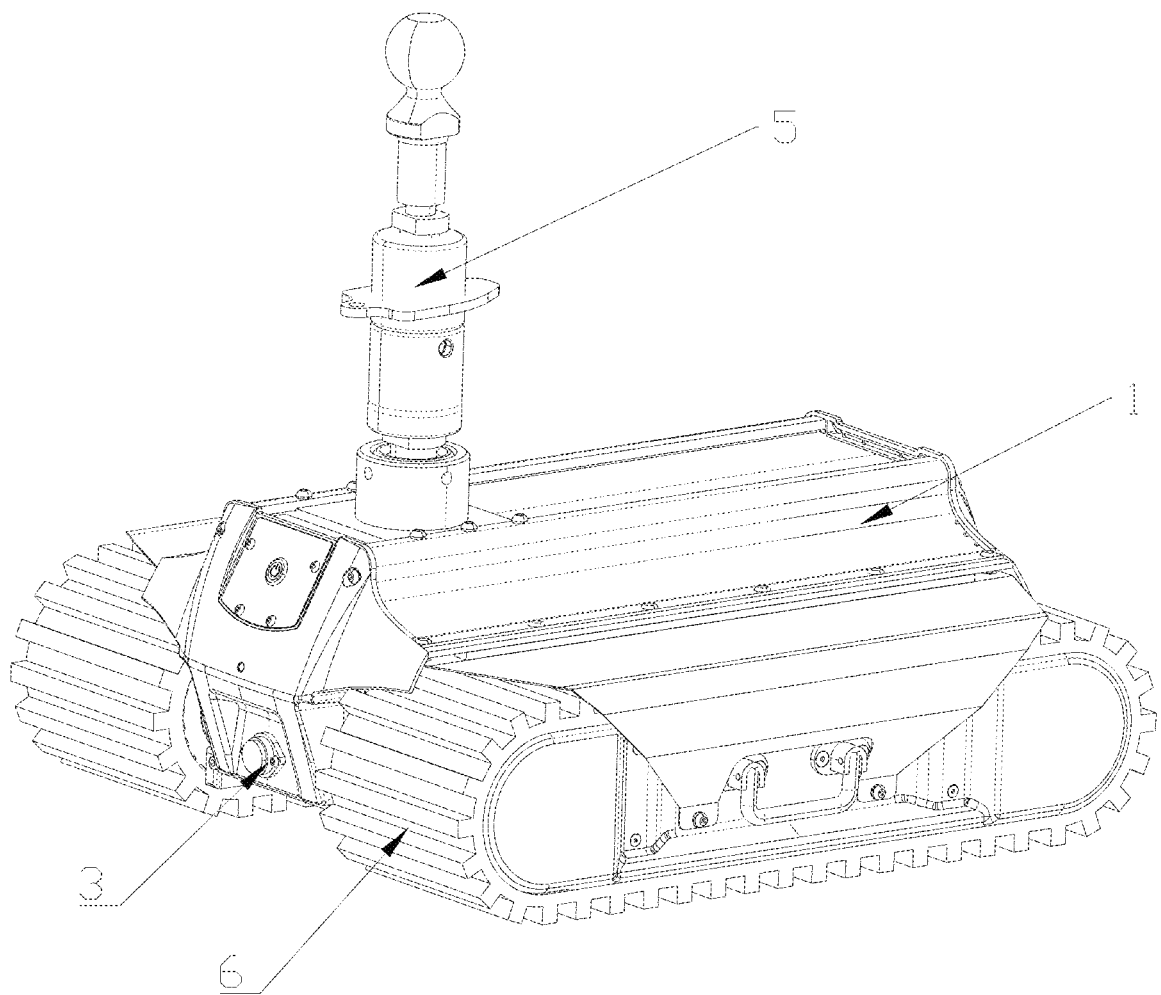
FIG. 2 is a schematic diagram of an internal structure of an intelligent towing robot in exemplary embodiments of the present application when viewed from above.

1—vehicle body;
11—main body;
110—locking positioning sliding groove;
111—mounting bar;
112—mounting sliding groove;
113—axle assembly mounting hole;
114—mounting hole for driving motor output shaft;
12—side frame;
121—handle;
122—inner partition;
13—external accessory;
14—partition plate;
141—positioning sliding bar;
15—side cover;
2—rotating wheel;
21—annular gasket;
22—axle head limiting plate;
23—outer track closing ring;
3—electrical system;
31—self-locking switch;
4—powertrain;
41—driving motor;
42—transmission device;
421—driving sprocket;
422—driven sprocket;
423—transmission chain;
43—axle assembly;
5—towing part;
50—limiting plate gasket
6—track;
7—load-bearing tension wheel;
71—transmission chain groove;
A1—first pin;
A2—second pin;
A3—third pin;
A4—fourth pin;
A5—fifth pin;
JK1—first relay;
Q13—first switch transistor;
R32—first resistor;
C15—first capacitor;
D13—first diode;
R37—second resistor;
F2—fuse protection device.

DESCRIPTION OF EMBODIMENTS

Hereinafter, the present application will be further described based on exemplary embodiments with reference to the accompanying drawings.

In addition, various components on the drawings are enlarged (thickened) or reduced (thinned) to facilitate understanding, but this practice is not intended to limit the protection scope of the present application.

The singular form of a word may also encompass its plural meaning, and vice versa.

In the description of the embodiments of the present application, it should be noted that if the terms "upper", "lower", "inside", "outside", etc. indicate an orientation or positional relationship based on the orientation or positional relationship shown in the accompanying drawings, or the orientation or positional relationship in which the products of the embodiments of the present application are usually placed when in use, it is only for the convenience of describing the present application and simplifying the description, and does not indicate or imply that the device or element referred to must have a specific orientation, be constructed and operated in a specific orientation, and therefore cannot be understood as a limitation on the present application. In addition, in the description of the present application, in order to distinguish different units, the words first, second, etc. are used in this specification, but these are not limited by the order of manufacture, nor can they be understood as indicating or implying relative importance, and their names may be different in the detailed description and claims of the present application.

The vocabulary in this specification is used to illustrate the embodiments of the present application, but is not intended to limit the present application. It should also be noted that, unless otherwise clearly specified and limited, the terms "arrange", "connect", and "couple" should be understood in a broad sense. For example, it can be a fixed connection, a detachable connection, or an integral connection; it can be a mechanical connection, a direct connection, an indirect connection through an intermediate medium, or a connection between the two elements. For those skilled in the art, the specific meanings of the above terms in this application can be specifically understood.

Some towing vehicles for towing towable RVs are all driven by driving wheels. This towing method is mostly suitable for towing light towed objects on smooth roads. However, the driving conditions of RVs are mostly complex and changeable, and wheel-type towing vehicles cannot meet all the towing requirements. In addition, this towing method is more complicated when turning is required after the towed object is driven to slide.

Therefore, there is an urgent need for a new towing vehicle that is easy to operate, flexible in steering, and easy to apply to towable RVs.

As shown in FIGS. 1 to 8, an intelligent towing robot includes a vehicle body 1, an electrical system 3, a powertrain 4, and a towing part 5. The vehicle body 1 includes a main body 11 and side frames 12 respectively connected to two sides of the main body 11. The main body 11 has an upper mounting chamber and a lower mounting chamber. The electrical system 3 is connected to the upper mounting chamber. The electrical system 3 includes a battery assembly, a vehicle controller, and an electrical harness. The powertrain 4 is arranged in the lower mounting chamber. In some embodiments, this arrangement has the advantages of high integration and high space utilization, etc.

Axle assemblies 43 extending through the lower mounting chamber along a left-to-right direction are provided at the front end and the rear end of a lower part of the main body 11. Two sides of each axle assembly 43 are respectively connected with rotating wheels 2. The outer side of the rotating wheels 2 on the two sides of the main body are meshed with tracks 6, such that the circumferential rotation of the rotating wheels 2 drive the tracks 6 to move, thereby realizing the displacement of the towing robot. In some embodiments, this enhances the grip of the towing robot, and meets the driving requirements under various road conditions.

The powertrain 4 includes four driving motors 41 and a transmission device 42. Each of the driving motors 41 is independently connected to the rotating wheel 2 through the transmission device 42, so that a larger motor can be accommodated under the same body width. In some embodiments, this has the advantages of high torque and strong load capacity.

In some embodiments, one end of the driving motor 41 is connected to the main body 11, and the other end, i.e., the output end of the driving motor 41 extends toward the side of the main body 11 and extends out of the main body 11. The four driving motors 41 are arranged in a staggered way on two sides of the main body 11 in the same horizontal plane, and are independently connected to the rotating wheels 2 through the transmission device 42, respectively. The two rotating wheels 2 located at the front end or the rear end of the main body 11 are connected through the axle assembly 43.

It should be noted that since the friction resistance of the track base during on-the-spot rotation is proportional to the ratio L/B of the track's ground contact length L to the track's center-to-center width B, to ensure the friction resistance of the tracked robot during movement, this product needs to control the ratio L/B to 1 to 1.2. If the traditional solution in which the motors are arranged in a horizontally opposed way is adopted, the width of the whole robot body will increase, resulting in the need to increase the length of the robot body accordingly, resulting in an increase in the overall size. Therefore, in some embodiments, in order to reduce the size of the whole robot and achieve the purpose of convenient transportation and use, the staggered side-by-side arrangement of four motors is selected.

Through the above arrangement, on the one hand, the four driving motors 41 are used to drive the four rotating wheels 2 to rotate respectively, so that the vehicle body can move in various ways, such as move forward, move backward, rotate on the spot, and rotate around a single wheel. The two front wheels and the two rear wheels can rotate differentially to adapt to different usage environments and changes in travel directions, and provide greater torque for the rotating wheels 2 to increase the towing capacity. On the other hand, the staggered arrangement of the four motors can make full use of the internal space of the main body 11. In some embodiments, under the same vehicle body width, compared with the symmetrical layout, the staggered arrangement allows larger motors to be accommodated, so that the robot can have higher torque without increasing the weight of the body frame, so as to enhance the load capacity, obstacle crossing ability, and escape ability.

In some embodiments, the output end of the driving motor 41 is connected to a driving sprocket 421. A driven sprocket 422 is provided on the rotating wheel 2. The driving sprocket 421 and the corresponding driven sprocket 422 are connected and transmitted through a transmission chain 423. The transmission device 42 includes the driving sprocket 421, the driven sprocket 422, and the transmission chain 423.

In some embodiments, the rotating wheel 2 includes a left halftrack wheel and a right halftrack wheel, and the driven sprocket 422 is installed between the left halftrack wheel and the right halftrack wheel, so that the driven sprocket 422 and the transmission chain 423 do not affect the installation and operation of the track 6.

In some embodiments, the number of the transmission chains 423 is 4, two of which are long chains and the other two are short chains. Two transmission chains 423 located on the same side of the vehicle body 1 are of different lengths, i.e., one long chain and one short chain, so that the tracks on two sides of the vehicle body 1 have the same time delay when the motors reverse, aiding in maintaining direction.

In some embodiments, when the transmission chain 423 is a long chain, its length is 35-45 sections. In some embodiments, when the transmission chain 423 is a short chain, its length is 25-35 sections. In some embodiments, this is used to achieve better transmission effect and ensure the tracked robot's strong load capacity, obstacle crossing ability, and escape ability.

It should be added that, based on the staggered arrangement of the four driving motors 41, there are two schemes for arranging the transmission chains. One scheme is to use chains of the same length on each side, that is, two short chains are used on one side and two long chains are used on the other side. The other scheme is to use a long chain and a short chain on each side. Because one side of the chain is in a tensioned state and the other side is in a relaxed state during operation, when the motor is reversed, there will be a short delay because the relaxed chain needs to be tensioned before it can transmit torque, and the delay time depends on the length of the chain. Therefore, if the first scheme is used to arrange the chain, the delay time of the tracks on two sides will be unequal when the reversal is needed, resulting in a deflection of the operation angle of the robot. Therefore, the second arrangement scheme is adopted so that the tracks on two sides have the same time delay when the motors reverse, so as to facilitate maintaining the direction.

Figure 4:
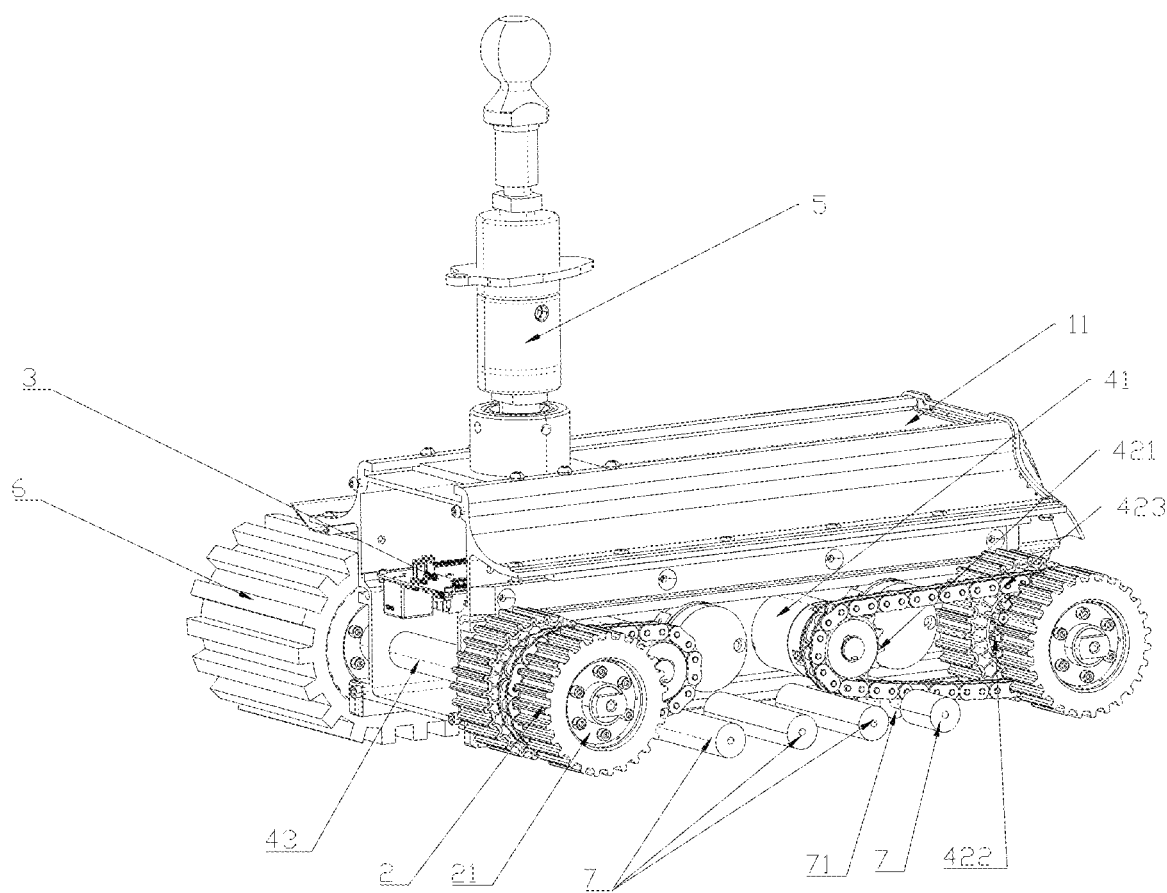
FIG. 4 is a schematic diagram of a three-dimensional structure of an intelligent towing robot in exemplary embodiments of the present application in which some structural parts are removed on the basis of FIG. 3.
Figure 5:
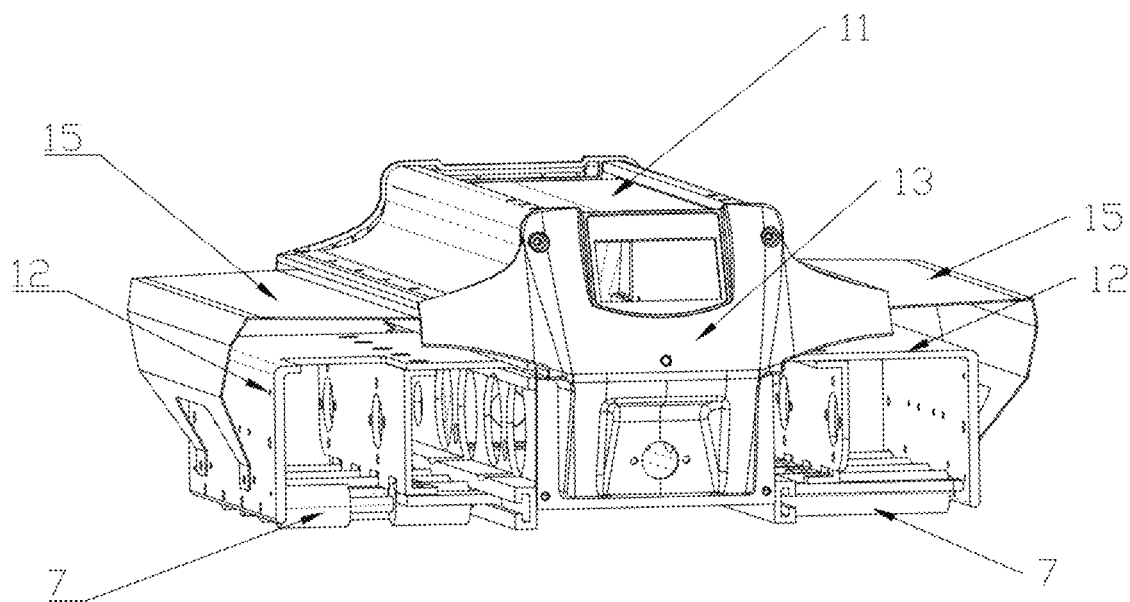
FIG. 5 is a schematic diagram of a three-dimensional structure of a vehicle body in exemplary embodiments of the present application.
Figure 6:
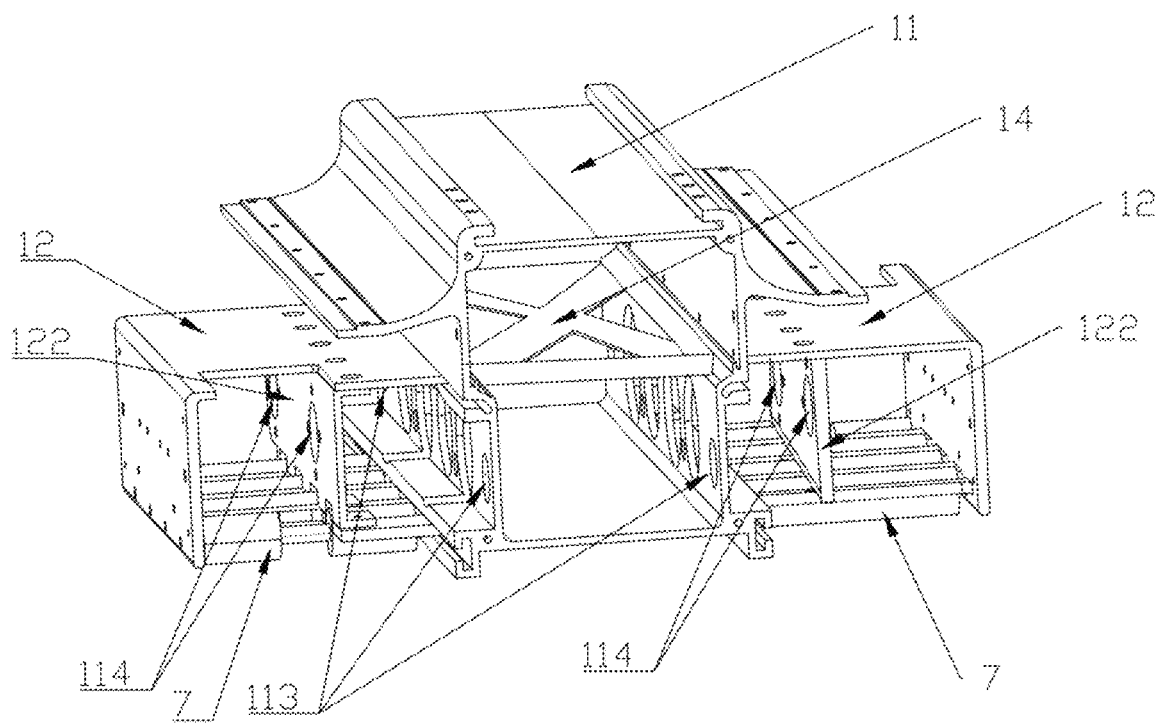
FIG. 6 is a schematic diagram of a three-dimensional structure of a vehicle body in exemplary embodiments of the present application in which some parts are removed.

In some embodiments, in order to extend the service life of the rotating wheel 2, the rotating wheel 2 also includes an annular gasket 21, as shown in FIG. 4, the annular gasket 21 is connected to a positioning shoulder on the outside of the rotating wheel 2 and the middle of the rotating wheel 2, and the connection position is fixed by bolts. In some embodiments, this is to reduce the damage to the rotating wheel 2 caused by the friction generated during the rotation.

Figure 3:
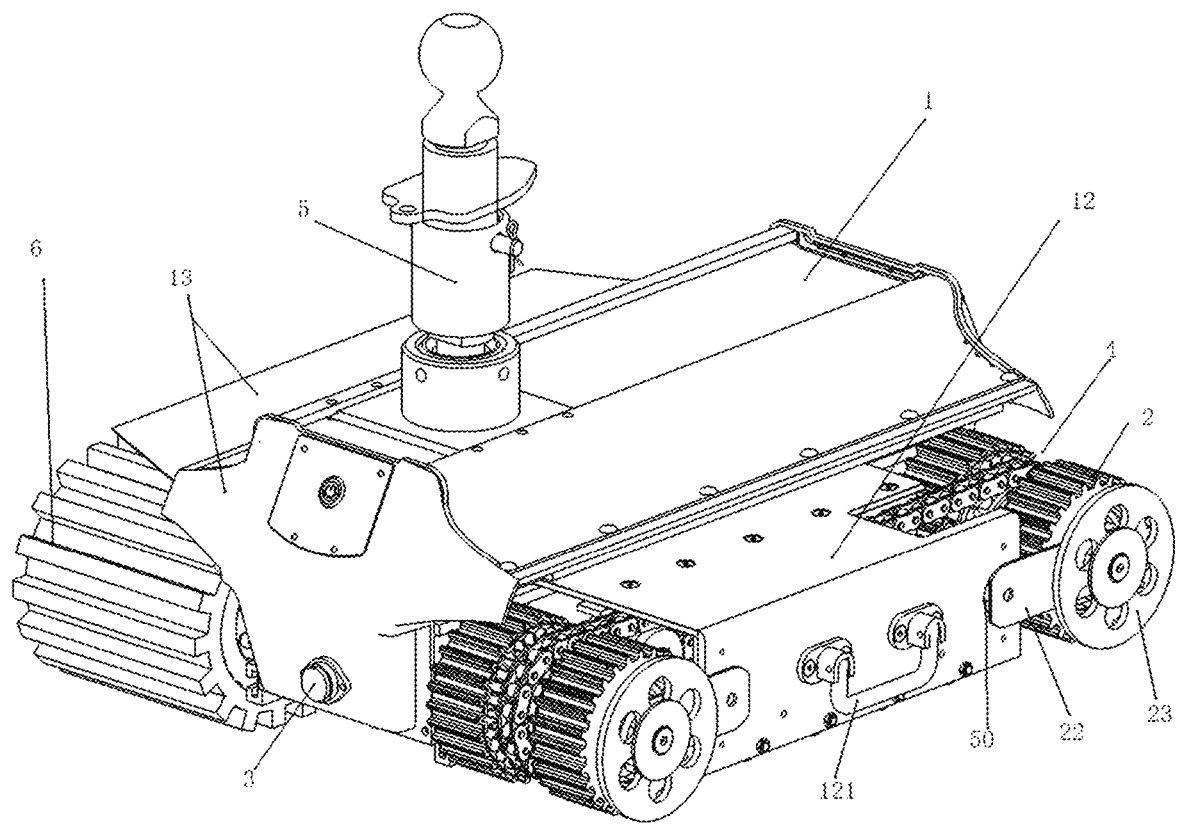
FIG. 3 is a schematic diagram of a three-dimensional structure of an intelligent towing robot in exemplary embodiments of the present application in which external accessories on a left side of a vehicle body and a left track are removed.

In some embodiments, in order to limit the axial displacement of the track 6, an axle head limiting plate 22 and an outer track closing ring 23 are also provided on the outer side of the rotating wheel 2. As shown in FIG. 3, one end of the axle head limiting plate 22 is installed on the axle assembly 43, and the other end of the axle head limiting plate 22 is connected to the side frame 12 of the vehicle body 1 through a limiting plate gasket 50. By adjusting the position of the limiting plate gasket 50, the axle head position of the axle assembly 43 can be adjusted, and the outer track closing ring 23 is installed on the axle head through a retaining spring and a retaining ring axle head. The protrusion of the inner ring of the track is positioned on the outer track closing ring to limit the axial displacement of the track.

In some embodiments, the intelligent towing robot also includes a load-bearing tension wheel 7. The number of the load-bearing tension wheels 7 is more than one. The multiple load-bearing tension wheels 7 are respectively connected to the lower part of both sides of the main body 11, and are in contact with the track 6 between two adjacent wheels 2. In some embodiments, the load-bearing tension wheel 7 includes a pin shaft and a rubber wheel fitting around the pin shaft, so that when the track 6 passes through a rugged road, the load-bearing tension wheel 7 may play a supporting role to prevent the chassis from being scratched.

In some embodiments, in order to prevent the arrangement of the load-bearing tension wheel 7 from interfering with the transmission of the transmission chain 423, a transmission chain groove 71 is provided on the circumference of the load-bearing tension wheel 7 adjacent to the transmission chain 423. The transmission chain groove 71 is a groove arranged along the circumference of the load-bearing tension wheel 7. The transmission chain 423 passes through the transmission chain groove 71, and there is no contact between the load-bearing tension wheel 7 and the transmission chain 423. In some embodiments, this is to achieve structural avoidance, making the overall structure more compact and the size smaller.

In some embodiments, in order to further increase the practicality of the present application, the main body 11 is in the shape of a (hollow) rectangular tube. The number of the side frames 12 is two. The two side frames 12 are in the shape of a U-shaped cover and are respectively connected to the two sides of the main body 11. A handle 121 for easy grasping is provided on the outer side of the side frame 12, and the side frame 12 and the main body 11 are detachably connected through a sliding block and a sliding groove that cooperate with each other.

Figure 7:
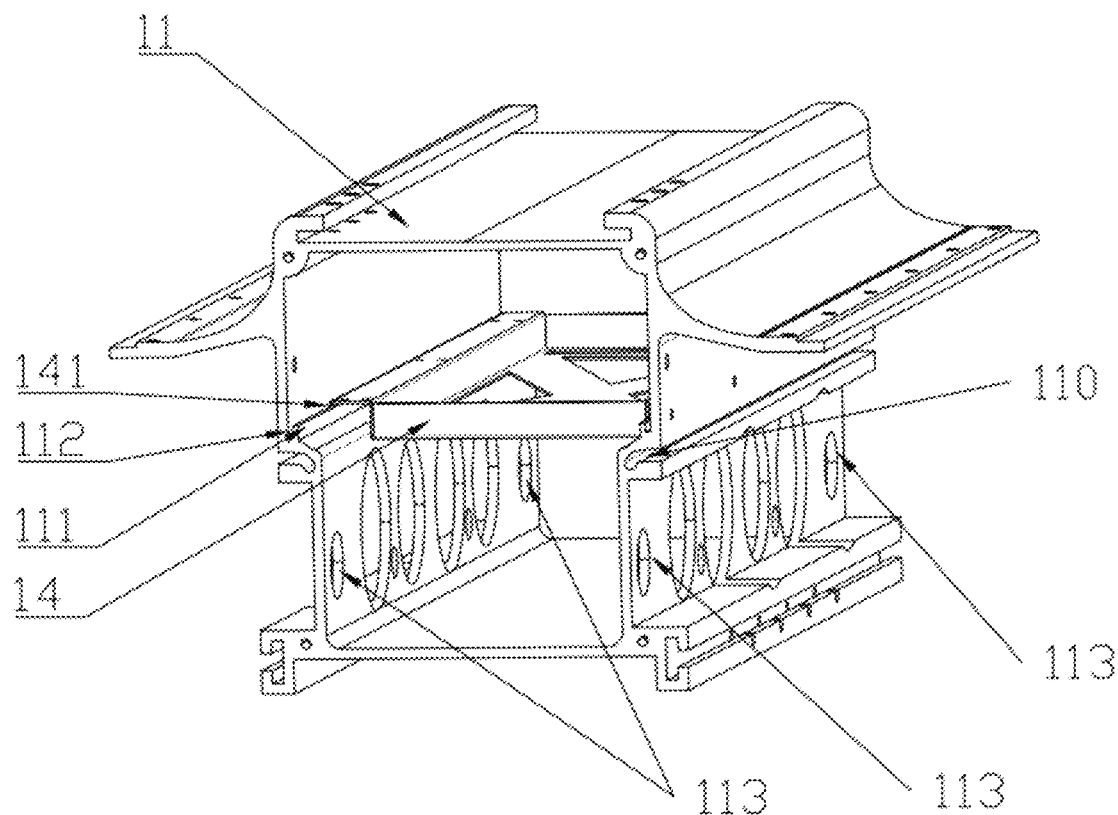
FIG. 7 is a schematic diagram of a three-dimensional structure of a main body in exemplary embodiments of the present application.

In some embodiments, as shown in FIG. 7, the middle and lower parts of the left side of the main body 11 are provided with a locking positioning sliding groove 110 extending in the front-to-rear direction (horizontally), the inside of the locking positioning sliding groove 110 is large and its opening is small (i.e., dovetail shape). The two sides (the two ends of the U-shape) of the left and right side frames are respectively provided with locking sliding bars that cooperate with and are insertable into the locking positioning sliding grooves 110. The locking sliding bar slides into the inside of the locking positioning sliding groove 110 from one end (along the front-to-rear direction), to fixedly connect the left and right side frames to the main body 11 from the upper, lower, left, and right. In some embodiments, this has the advantages of convenient and quick assembly, and avoids the problems of inconvenient operation and limited space caused by the use of multiple screws or bolts for installation.

In some embodiments, an inner partition 122 is provided in the middle of the side frame 12, and two mounting holes 114 for driving motor output shafts are respectively provided on the inner partitions 122 located on two sides of the main body 11. In some embodiments, the provision of the inner partition 122 enhances the stability of the internal transmission of the towing robot, avoids mutual interference between accessories, and facilitates the positioning of the installation position of the driving motor.

In some embodiments, four mounting holes 114 for driving motor output shafts are staggered and arranged corresponding to the driving motor mounting holes, and the installation directions of the two adjacent motors located at the same end are opposite (i.e., the output shaft of one motor faces left and the output shaft of the other motor faces right). Each of the driving motors 41 extends outward to extend out of the mounting hole 114 for driving motor output shaft, and is independently connected to the rotating wheel 2 through the transmission device 42, so that the four driving motors are fixedly installed in the four mounting holes 114 for driving motor output shafts in a staggered arrangement. In some embodiments, this is used to optimize the structural layout, so that after the driving sprocket and the driven sprocket are installed, the overall structure is more compact, and the lateral width and the length in the front-to-rear direction of the towing vehicle are greatly reduced.

In some embodiments, a partition plate 14 is connected to the middle of the inner side of the main body 11, and the partition plate 14 divides the interior of the main body 11 into an upper mounting chamber and a lower mounting chamber. The front and rear parts of two sides of the lower mounting chamber are respectively provided with axle assembly mounting holes 113, and a plurality of driving motor mounting holes are provided between the axle assembly mounting holes 113 on the same side. The driving motor 41 is installed in the lower mounting chamber, and the electrical system 3 is installed in the upper mounting chamber. The electrical system 3 is electrically connected to the driving motor 41. In some embodiments, this has the advantages of compact structure, small size, and good integration.

In some embodiments, the partition plate 14 is detachably connected to the main body 11, and parallel mounting bars 111 are respectively provided on the left and right sides of the middle of the inner side of the main body 11. Mounting sliding grooves 112 are respectively provided on the upper side of the mounting bars 111. Positioning sliding bars 141 cooperating with the mounting sliding grooves are respectively provided on the left and right sides of the partition plate 14. The partition plate 14 can be installed on the upper side of the mounting bars 111 in a way of being slidable forward and backward via the positioning sliding bars 141. In some embodiments, this has the advantages of simple and convenient installation and easy disassembly.

In some embodiments, the vehicle body 1 also includes a side cover 15. The number of the side covers 15 is two. One end of the two side covers 15 is connected to the upper part of the main body 11, and the other end is connected to the middle part of the side frame 12. In some embodiments, this is to protect its internal components.

In some embodiments, the vehicle body 1 also includes an external accessory 13. Interactive devices such as a self-locking switch 31, an emergency stop voltmeter, a power meter, a charging stand, etc., are integrated on the external accessory. In some embodiments, this is to increase the convenience of operation.

In some embodiments, the self-locking switch 31 includes a self-reset button, a first relay JK1, a first switch transistor Q13, a first resistor R32, and a first capacitor C15. The first contact of the first relay JK1 (labeled 30 in the figure) is connected to the positive electrode P+ of the power supply, and the second contact (labeled 87 in the figure) is connected to the input terminal Vin of the load which is an electrical load. The first end (labeled 85 in the figure) of the coil of the first relay JK1 is also connected to the power supply, and the second end (labeled 86 in the figure) of the coil is connected to the drain (D electrode) of the first switch transistor Q13. The source (S electrode) of the first switch transistor Q13 is grounded. By providing the self-locking switch 31, accurate control of the power supply state of the towing robot can be ensured.

In some embodiments, the first switch transistor Q13 is an NMOS transistor, that is, it is turned on at a high level and turned off at a low level.

In some embodiments, the first resistor R32 is 8K to 10K, and the first capacitor C15 is 0.05 uF to 0.1 uF.

Figure 8:
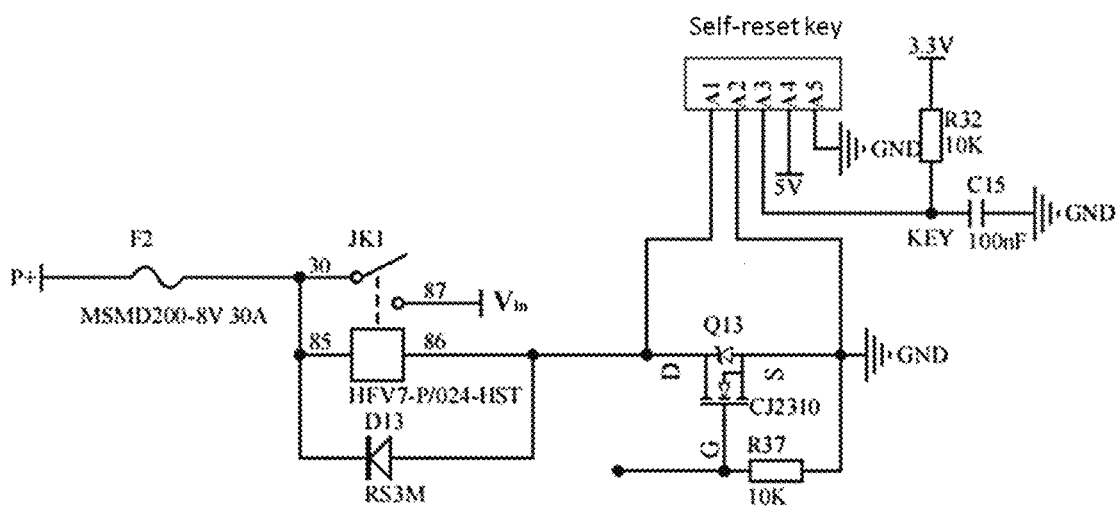
FIG. 8 is a circuit diagram of a self-locking switch in exemplary embodiments of the present application.

In some embodiments, the self-reset button includes a mechanical structure that can be pressed and released, and a plurality of pins that can change the on-off state according to the pressing and releasing states. In some embodiments, as shown in FIG. 8, it includes a first pin A1, a second pin A2, and a third pin A3. The first pin A1 is connected to the drain of the first switch transistor Q13, the second pin A2 is grounded, the third pin A3 is connected to the first end of the first resistor R32 and the positive electrode of the first capacitor C15, the second end of the first resistor R32 is connected to the pull-up power supply (in the embodiment shown in FIG. 8, the voltage of the pull-up power supply is 3.3V), and the negative electrode of the first capacitor C15 is grounded.

The first pin A1 and the third pin A3 respectively form a normally open switch with the second pin A2. In some embodiments, when the self-reset button is not manually pressed, it is always in a released state, and the first pin A1 and the third pin A3 remain disconnected from the second pin A2. Only when the self-reset button is manually pressed, the connection between the first pin A1, the third pin A3, and the second pin A2 is enabled, that is, the first pin A1 and the third pin A3 are both grounded.

The working process of the self-locking switch of the towing robot is as below.

In a situation where the towing robot is in a shutdown state, when the self-reset button is pressed, the first pin A1 is connected to the second pin A2, the coil of the first relay JK1 is energized, and the first contact and the second contact are attracted and connected, so as to realize the circuit connection between the power supply and the electric load (the electric load includes the motor and other electric equipment), so that the motor and other electric equipment of the towing robot are powered on, and at the same time, the third pin A3 is grounded so that the KEY end sends a low-level trigger signal. After the trigger signal is received by the MCU and other devices, a high level is sent to the gate of the first switch transistor Q13 through an I/O port of the MCU.

After the user let go of his/her hand, the self-reset button is released, the first pin A1 and the third pin A3 are disconnected from the ground, and the level of the KEY end is pulled up by the potential of the pull-up power supply. However, since the gate of the first switch transistor Q13 is kept at a high level, the coil of the first relay JK1 is kept in the energized state, thereby locking the conduction of the circuit between the power supply and the electric load.

After the self-reset button is pressed again, the KEY end is grounded again, thereby outputting a low-level trigger signal again. After the low-level trigger signal is received by the MCU and other devices again, a low-level signal is sent to the gate of the first switch transistor Q13, so that the first switch transistor Q13 is cut off. When the button is released again, the coil of the first relay JK1 cannot form a loop, the first contact is disconnected from the second contact, and the circuit between the power supply and the electric load is disconnected, thereby achieving a hard power-off of electrical equipment such as the motor of the towing robot.

Through the above-mentioned self-reset button structure and the circuit matched therewith, the on/off state between the power supply of the towing robot and the electric equipment can be switched every time the self-reset button is pressed, and the current on/off status can be locked after the button is released.

In addition to switching the gate level signal of the first switch transistor Q13 through the I/O pin of the MCU, various other falling edge triggered level conversion circuits can also be used to achieve the locking of the above switching signal. For example, a falling edge triggered level conversion circuit can be constructed using a falling edge triggered chip such as 74HC74. The input end of the circuit is connected to the KEY end, and the output end of the circuit is connected to the gate of the first switch transistor Q13. Each time after a low-level trigger signal output from the KEY end is received, the output level is flipped and locked until the next low-level trigger signal arrives.

In some embodiments, a second resistor R37 is further connected in series between the gate of the first switch transistor Q13 and the ground to protect the first switch transistor Q13 and ensure the stability of the gate signal.

In some embodiments, the self-locking switch of the towing robot also includes a first diode D13, the positive electrode of the first diode D13 is connected to the drain of the first switch transistor Q13, and the negative electrode of the first diode D13 is connected to the first contact of the first relay JK1. In some embodiments, by providing the first diode D13 (which is RS3M) at two ends of the coil of the first relay JK1, the excess charge stored in the coil after the contact of the first relay JK1 is disconnected can be neutralized, thereby avoiding the problem of false attraction.

The voltage of the power supply is 12V to 60V. In some embodiments, a fuse protection device F2 is connected in series between the first contact of the first relay JK1 and the power supply. In some embodiments, the fuse protection device F2 is a 30A-60A fuse protection device to achieve overcurrent protection of the circuit.

In some embodiments, as shown in FIG. 8, the self-reset button further includes a fourth pin A4, and a fifth pin A5. The fourth pin A4 is connected to a 5V power supply, and the fifth pin A5 is grounded. An LED can be connected between the fourth pin A4 and the fifth pin A5 to display the power supply status of the electric load.

The following describes this application in combination with specific application scenarios.

When it is necessary to use the intelligent towing robot of the present application to tow a towable RV, the towable RV is first connected to a towing part 5 via a cable, and then the control unit of the electrical system 3 processes and sends a pulse signal to the motor driver, so that four independent driving motors 41 rotate independently, and the driving motors 41 drive the driving sprockets 421 to rotate, and the driving sprockets 421 drive the driven sprockets 422 on the front and rear support shafts to rotate through the transmission chains 423 meshed with the driving sprockets 421. Since the driven sprocket 422 is rigidly connected to the rotating wheel 2, the driven sprocket 422 drives the rotating wheel 2 to rotate, and the rotating wheel 2 drives the track meshed with the outside of the rotating wheel 2 to rotate, thereby driving the intelligent towing robot to move, so as to drive the towable RV to move.

In some embodiments, since a plurality of load-bearing tension wheels 7 are provided between the lower part of the side frame 12 and the main body 11 and the load-bearing tension wheel 7 includes a pin shaft and a rubber wheel fitting around the pin shaft, when passing through a road with a rough surface, the load-bearing tension wheels can play a supporting role to prevent the chassis from being scratched.

Some embodiments of the present application provide an intelligent towing robot to solve the problems in the conventional technique of time-consuming and labor-intensive operation and the inability to tow heavy objects on complex and changeable road conditions.

In some embodiments, the presence of the main body provides the advantage of high integration. In some embodiments, the powertrain uses four motors to independently drive their respective track wheels so that a larger size motor can be accommodated under the same body width. In some embodiments, this has the advantages of compact structure, small size, high torque, strong load capacity, and flexible operation.

The intelligent towing robot provided by the embodiments of the present application may have at least the following beneficial effects.

In some embodiments of the present application, the main body has an upper installation chamber and a lower installation chamber, the powertrain system and the electrical system are respectively located in the upper and lower accommodating chambers, and the powertrain uses four motors to independently drive their respective track wheels, so that larger motors can be accommodated under the same vehicle body width. In some embodiments, this has the advantages of compact structure, small size, high torque, strong load capacity, and flexible operation.

The above is a detailed introduction to the specific implementation methods of the present application. For those skilled in the art, several improvements and modifications may be made to the present application without departing from the principles of the present application. These improvements and modifications also fall within the scope of protection of the claims of the present application.

What is claimed is:

1. An intelligent towing robot, comprising a vehicle body, an electrical system, a powertrain, and a towing part, wherein:

the vehicle body includes a detachably connected main body, detachably connected side frames, and a detachably connected external accessory; the external accessory is integrated with a self-locking switch;

the main body has an upper mounting chamber and a lower mounting chamber; the electrical system is integrated into the upper mounting chamber; the powertrain is arranged in the lower mounting chamber;

axle assemblies are respectively provided at a front end and a rear end of a lower part of the main body; each axle assembly passes through the lower mounting chamber in a left-to-right direction; two sides of each axle assembly are respectively connected with rotating wheels; the rotating wheels on two sides are meshed with tracks;

an inner partition is provided in a middle part of each side frame; two mounting holes for driving motor output shafts are respectively provided on the inner partitions located on two sides of the main body;

the powertrain includes four driving motors and a transmission device; the four driving motors are arranged on two sides of the main body in a same horizontal plane in a staggered way; one end of each driving motor is connected inside the main body, and an output end of each driving motor extends outward through a side of the main body, extends out of the mounting hole for the driving motor output shaft, and is independently connected to the rotating wheel through the transmission device;

an axle head limiting plate and an outer track closing ring are also provided on an outer side of each rotating wheel; a first end of the axle head limiting plate is mounted on the axle assembly, and a second end is connected to the side frame via a limiting plate gasket;

the main body is in a shape of a rectangular tube; two side frames are in a shape of a U-shaped cover and are respectively connected to two sides of the main body;

locking positioning sliding grooves extending in a front-to-rear direction are provided on a left middle part and a left lower part of the main body; each locking positioning sliding groove is in a dovetail shape with a large interior and a small opening; a locking sliding bar that cooperates with the locking positioning sliding groove in an insertable way is provided on a side of each side frame; and the locking sliding bar is slidably connected to the locking positioning sliding groove; and a partition plate is detachably connected to an inner middle part of the main body; mutually parallel mounting bars are respectively provided on a left side and a right side of the inner middle part of the main body; mounting sliding grooves are provided on an upper side of the mounting bars; positioning sliding bars cooperating with the mounting sliding grooves are respectively provided on a left side and a right side of the partition plate; the partition plate is slidably connected to the upper side of the mounting bars via the positioning sliding bars; and the partition plate divides an interior of the main body into the upper mounting chamber and the lower mounting chamber.

2. The intelligent towing robot according to claim 1, wherein:

the self-locking switch includes a self-reset button, a first relay, a first switch transistor, a first resistor, and a first capacitor; and the self-reset button includes a first pin, a second pin, and a third pin; the first pin is connected to a drain of the first switch transistor, the second pin is grounded, and the third pin is connected to a first end of the first resistor and a positive electrode of the first capacitor; and each of the first pin and the third pin forms a normally open switch with the second pin.

3. The intelligent towing robot according to claim 1, wherein:
- an output end of the driving motor is connected to a driving sprocket;
- the rotating wheel is provided with a driven sprocket;
- the driving sprocket and a corresponding driven sprocket are connected and transmitted via a transmission chain; and
- the transmission device includes the driving sprocket, the driven sprocket, and the transmission chain.

4. The intelligent towing robot according to claim 3, wherein:
- four transmission chains are provided;
- two of the transmission chains are long chains and the other two of the transmission chains are short chains; and
- two transmission chains located on a same side of the vehicle body are of different lengths.

5. The intelligent towing robot according to claim 3, wherein:
- the rotating wheel includes a left halftrack wheel and a right halftrack wheel; and the driven sprocket is installed between the left halftrack wheel and the right halftrack wheel.

6. The intelligent towing robot according to claim 1, wherein:
- the rotating wheel further includes an annular gasket; and
- the annular gasket is connected to a positioning shoulder on an outer side of the rotating wheel and to a middle part of the rotating wheel.

7. The intelligent towing robot according to claim 3, further comprising a load-bearing tension wheel, wherein a plurality of the load-bearing tension wheels are provided, and the plurality of the load-bearing tension wheels are respectively connected to a left lower part and a right lower part of the main body and are in contact with the track between two adjacent rotating wheels.

8. The intelligent towing robot according to claim 7, wherein:
- a transmission chain groove is provided on an outer wall of the load-bearing tension wheel adjacent to the transmission chain;
- the transmission chain groove is a groove arranged along a circumference of the load-bearing tension wheel; and
- the transmission chain passes through the transmission chain groove, so that there is no contact between the load-bearing tension wheel and the transmission chain.

* * * * *